US009196104B2

(12) United States Patent
Dumas et al.

(10) Patent No.: US 9,196,104 B2
(45) Date of Patent: Nov. 24, 2015

(54) WIRELESS ACCESS CONTROL SYSTEM AND RELATED METHODS

(71) Applicant: Unikey Technologies, Inc., Orlando, FL (US)

(72) Inventors: Philip C. Dumas, Orlando, FL (US); Thomas Bennett, Maitland, FL (US); Steven Fiske, Orlando, FL (US)

(73) Assignee: UNIKEY TECHNOLOGIES INC., Orlando, FL (US)

( * ) Notice: Subject to any disclaimer, the term of this patent is extended or adjusted under 35 U.S.C. 154(b) by 199 days.

(21) Appl. No.: 13/654,132

(22) Filed: Oct. 17, 2012

(65) Prior Publication Data

US 2013/0237193 A1 Sep. 12, 2013

Related U.S. Application Data

(63) Continuation-in-part of application No. 13/415,365, filed on Mar. 8, 2012.

(60) Provisional application No. 61/453,737, filed on Mar. 17, 2011.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G08B 5/22*** | (2006.01) |
| ***G08B 29/00*** | (2006.01) |
| ***G08C 19/16*** | (2006.01) |
| ***G05B 11/01*** | (2006.01) |
| ***G07C 9/00*** | (2006.01) |

(52) U.S. Cl.
CPC .. *G07C 9/00571* (2013.01); *G07C 2009/00793* (2013.01); *G07C 2209/04* (2013.01)

(58) Field of Classification Search
USPC .................................................. 340/5.1–5.92
See application file for complete search history.

(56) References Cited

U.S. PATENT DOCUMENTS

| | | | |
|---|---|---|---|
| 6,072,402 | A | 6/2000 | Kniffin et al. |
| 6,236,333 | B1 | 5/2001 | King |

(Continued)

FOREIGN PATENT DOCUMENTS

| | | |
|---|---|---|
| CN | 101532353 | 9/2009 |
| JP | 2000145222 | 5/2000 |

(Continued)

OTHER PUBLICATIONS

International Search Report of corresponding PCT/US2013/059699.

(Continued)

*Primary Examiner* — Steven Lim
*Assistant Examiner* — Muhammad Adnan
(74) *Attorney, Agent, or Firm* — Allen, Dyer, Doppelt, Milbrath & Gilchrist, P.A.

(57) ABSTRACT

A wireless access control system includes a remote access device. A plugin device communicates with the remote access device. A lock controls the ability to lock and unlock a door in which the lock is disposed. The lock is in communication with the plug in device. The plug in device determines a distance between the remote access device and the lock and causes the lock to communicate with the remote access device when the remote access device is at a distance less than or equal to a predetermined distance from the lock to enable the lock to be unlocked.

31 Claims, 14 Drawing Sheets

(56) References Cited

U.S. PATENT DOCUMENTS

| | | | | |
|---|---|---|---|---|
| 7,173,516 | B2 * | 2/2007 | Mullet et al. | 340/5.71 |
| 7,701,331 | B2 | 4/2010 | Tran | |
| 2002/0013909 | A1 * | 1/2002 | Baumeister et al. | 713/201 |
| 2003/0222758 | A1 * | 12/2003 | Willats et al. | 340/5.72 |
| 2006/0164208 | A1 * | 7/2006 | Schaffzin et al. | 340/5.64 |
| 2008/0018437 | A1 * | 1/2008 | Reichling et al. | 340/426.1 |
| 2008/0117176 | A1 * | 5/2008 | Ko et al. | 345/173 |
| 2008/0231433 | A1 * | 9/2008 | McBride et al. | 340/426.17 |
| 2008/0238610 | A1 * | 10/2008 | Rosenberg | 340/5.7 |
| 2009/0002153 | A1 | 1/2009 | Berstis et al. | |
| 2009/0066476 | A1 | 3/2009 | Raheman | |
| 2010/0052931 | A1 | 3/2010 | Kolpasky et al. | |
| 2010/0059231 | A1 | 3/2010 | Thomas et al. | |
| 2010/0164683 | A1 * | 7/2010 | Sharma et al. | 340/5.63 |
| 2010/0201536 | A1 | 8/2010 | Robertson et al. | |
| 2010/0245038 | A1 | 9/2010 | Ghabra et al. | |
| 2010/0306549 | A1 * | 12/2010 | Ullmann | 713/185 |
| 2011/0223868 | A1 * | 9/2011 | Kojima et al. | 455/67.11 |
| 2012/0234058 | A1 | 9/2012 | Neil et al. | |
| 2012/0258681 | A1 * | 10/2012 | Hanover | 455/404.2 |
| 2012/0280783 | A1 | 11/2012 | Gerhardt et al. | |
| 2013/0176107 | A1 | 7/2013 | Dumas et al. | |
| 2013/0241694 | A1 * | 9/2013 | Sharma et al. | 340/5.64 |
| 2014/0077929 | A1 | 3/2014 | Dumas et al. | |
| 2014/0292481 | A1 | 10/2014 | Dumas et al. | |

FOREIGN PATENT DOCUMENTS

| | | | |
|---|---|---|---|
| JP | 2003262072 | | 9/2003 |
| KR | 1020030083538 | | 10/2003 |
| KR | 20040093937 | A | 11/2004 |
| KR | 20050005786 | A | 1/2005 |
| KR | 1020080086623 | | 9/2008 |
| KR | 2020100001206 | | 2/2010 |
| WO | 2011159921 | | 12/2011 |
| WO | WO-2012/064263 | A1 | 5/2012 |

OTHER PUBLICATIONS

Dumas et al., U.S. Appl. No. 14/681,243, filed Apr. 8, 2015.
Dumas et al., U.S. Appl. No. 14/681,263, filed Apr. 8, 2015.
Dumas et al., U.S. Appl. No. 14/681,281, filed Apr. 8, 2015.
Written Opinion and International Search Report of PCT/US2013/059695.

* cited by examiner

WIRELESS ACCESS CONTROL SYSTEM AND RELATED METHODS

CROSS REFERENCE TO RELATED APPLICATION(S)

This application is a Continuation-In-Part of copending U.S. patent application Ser. No. 13/415,365, filed on Mar. 8, 2012, which claims the benefit of Provisional Patent Application No. 61/453,737, filed Mar. 17, 2011, in its entirety and is hereby incorporated by reference.

FIELD OF THE INVENTION

The present invention generally relates to access control systems, and more particularly, to passive keyless entry control systems.

BACKGROUND

A passive keyless entry (PKE) system offers an increased level of convenience over a standard lock and key, for example, by providing the ability to access a secure building or device without having to find, insert, and turn a traditional key. A user may simply approach a locked PKE lock and with little if any pause or interaction, the lock grants this user access if they are carrying an authorized token.

A PKE system is currently used in an automotive application and may offer increased convenience by identifying drivers and unlocking the car as they approach. Automotive access is traditionally given by inserting a key into the lock or by pushing buttons on a traditional remote keyless entry (RKE) system. In contrast, a PKE system grants access with reduced user interaction through the use of a token carried by the driver.

Several technical challenges have been encountered during the engineering of a radio frequency (RF) PKE system, for example, for use in a residential lock. The desired basic perceived behavior of the PKE system in a residential application may be as follows: 1) the user approaches and touches the lock; 2) the lock authenticates the user with a reduced delay; 3) the lock unlocks; 4) the lock may not operate if the authorized user is outside a desired range and the lock is touched by another, unauthorized, user; 5) the lock may not operate if the authorized user is on the inside of the house, and the lock is touched on the outside by an unauthorized user; and 6) when an authorized user revokes a key from another user or a remote access device needs to be replaced, it may be revoked and confirmed within a few seconds.

Indeed, as will be appreciated by those skilled in the art, with respect to the above desired basic perceived behavior of the PKE system in a residential application, primary challenges to be addressed include items 2 (speed), 4 (distance), 5 (location), and 6 (timely revocation). Accordingly, it may be desirable to improve authentication speed, proximity measurement, and power consumption, for example.

SUMMARY OF THE INVENTION

A wireless access control system includes a remote access device for accessing a lock. The lock contains a controller for controlling the ability to lock and unlock a door in which the lock is disposed. The lock communicates with the remote access device when the remote access device is at a distance less than or equal to a predetermined distance from the lock to enable the lock to be unlocked by the remote access device. The lock includes a visual indicator for indicating to a user one of: 1) the user is within a range to control the lock; 2) error in operation; 3) a locked condition; or 4) a software upgrade.

In another embodiment, the wireless access control system includes a server, the server storing information about the remote access, device and controller information. The server determines whether a new unique remote access device identifier is to be added to the system containing a particular lock. Once the server confirms that a new unique remote access device identifier is to be associated with the controller, the server maps the new unique remote access device identifier with the controller and archives any former unique remote access device identifier which is no longer to be associated with the controller. When the remote access device is within a local area connection range, the remote access device pairs with the controller and transfers control by the user to the new device having the new unique remote access device identifier.

Figure 4:
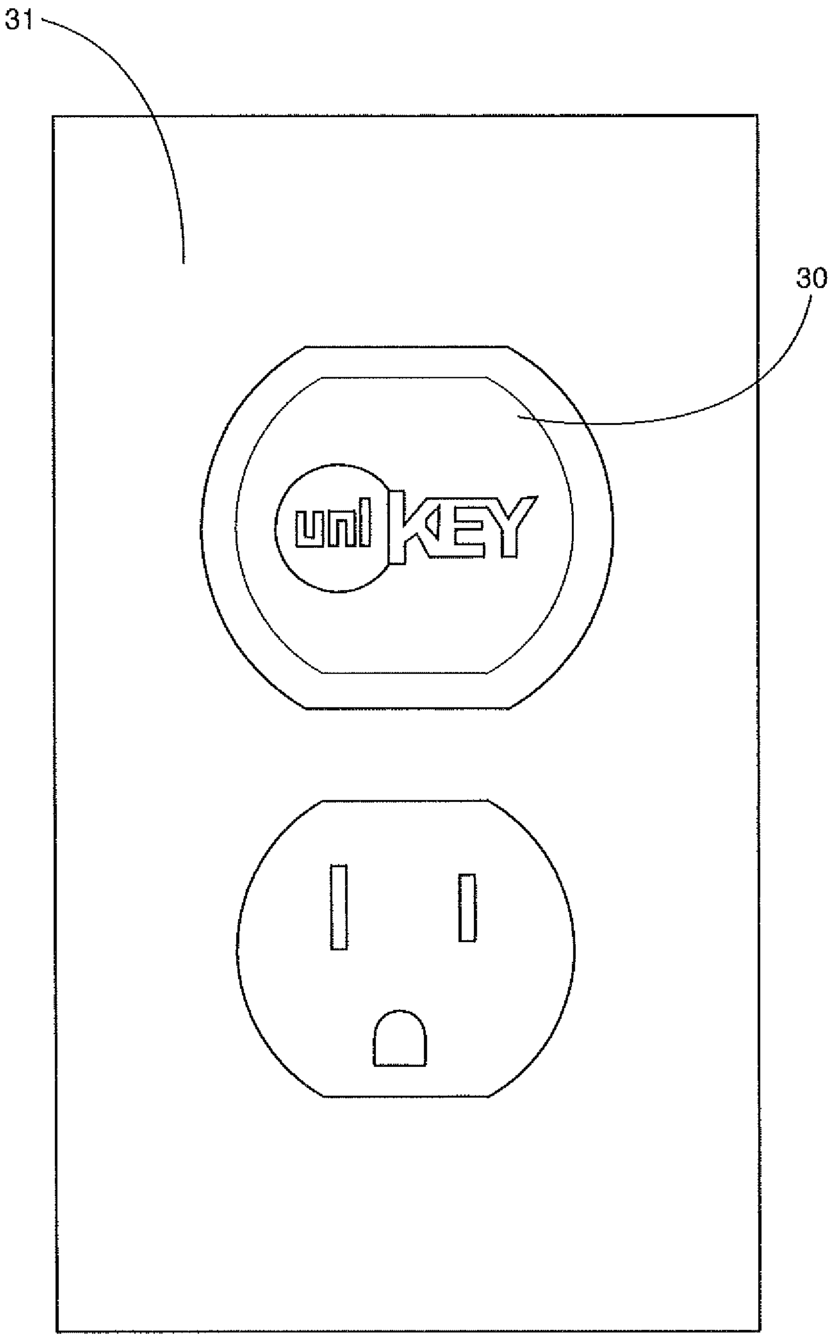
Figure 5:
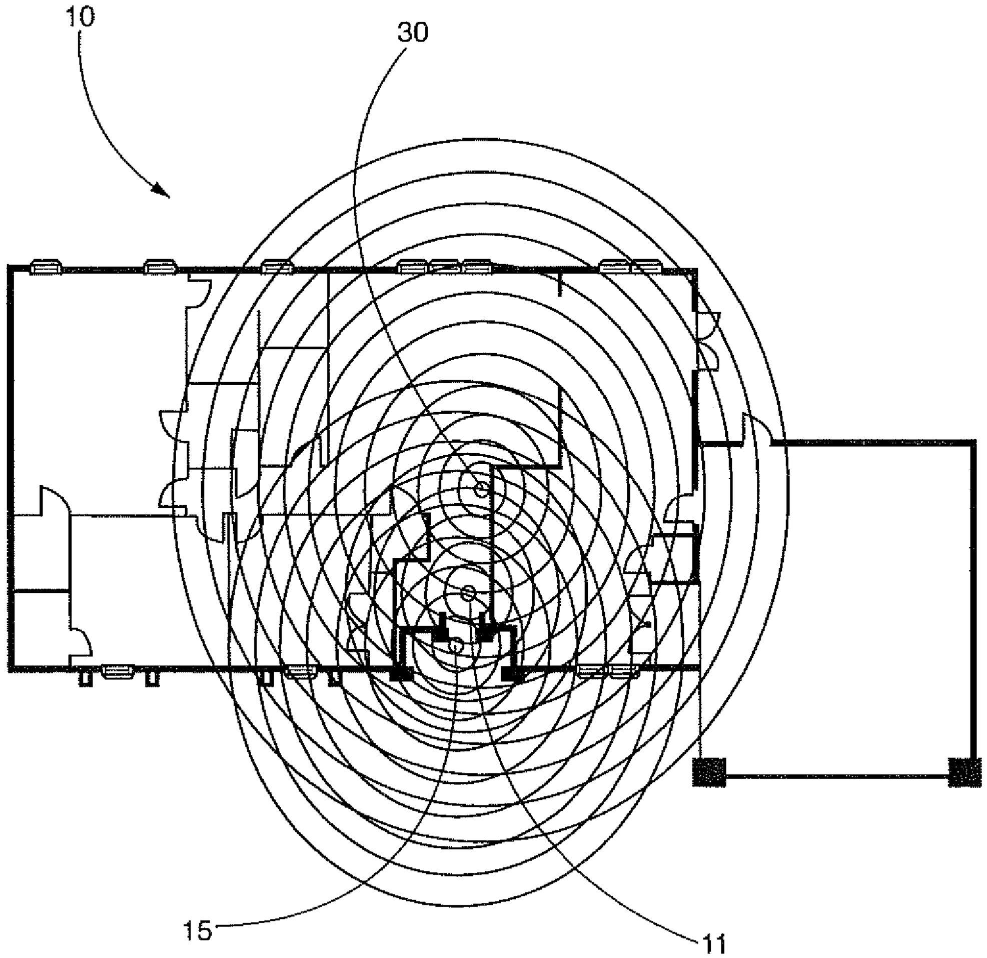
Figure 6:
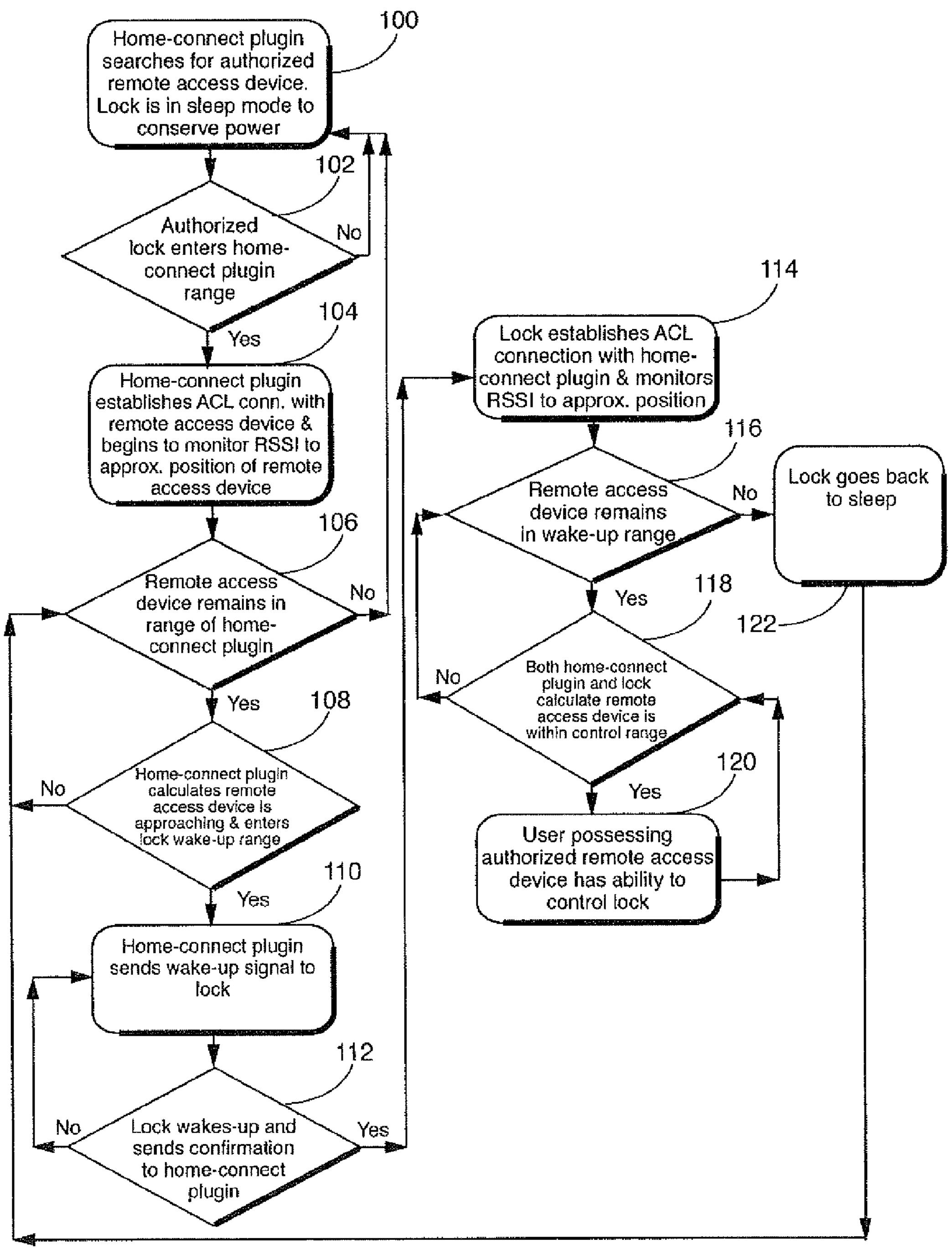

FIG. **2*a*** is a perspective view of a lock constructed in accordance with the invention;

FIG. **2*b*** is a perspective view of a lock constructed in accordance with another embodiment of the invention;

FIG. **3*a*** is a top plan view of a remote access device constructed in accordance with the invention as a key;

FIG. **3*b*** is a front plan view of a remote access device constructed in accordance with yet another embodiment of the invention as an application for a cell phone;

FIG. 4 is a front plan view of a home-connect plugin of the wireless access system constructed in accordance with the invention;

FIG. 5 is a schematic diagram of the communication between the components of the wireless access system in a typical residential system layout in accordance with the invention; and FIG. 6 is a flow chart of operation of the wireless access system in accordance with the invention.

Figure 7:
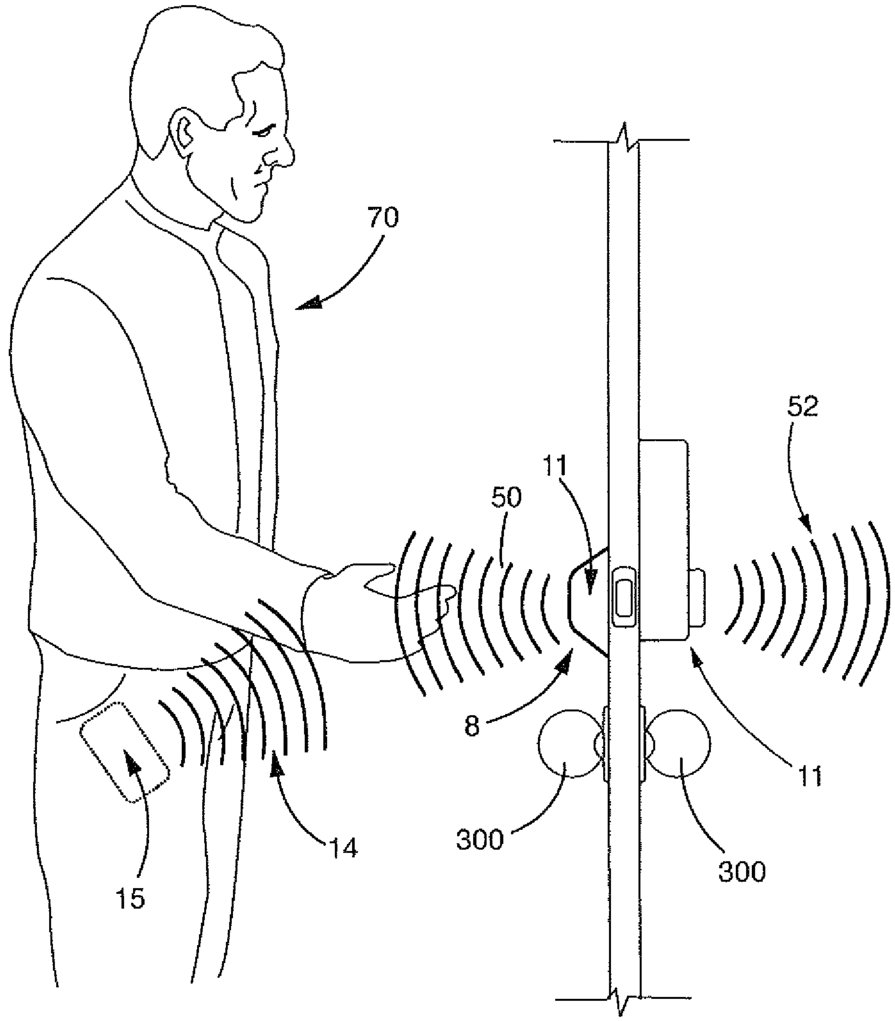
Figure 8:
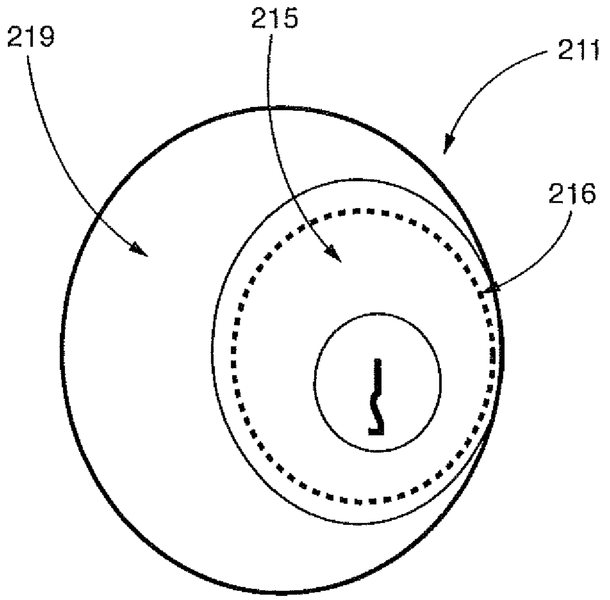
Figure 9:
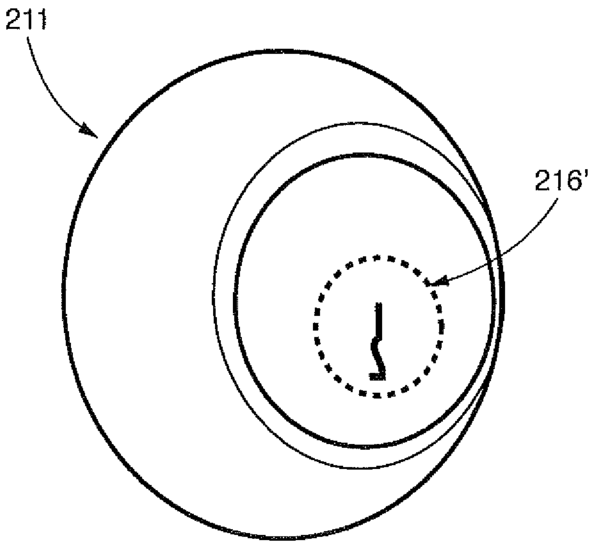
Figure 10:
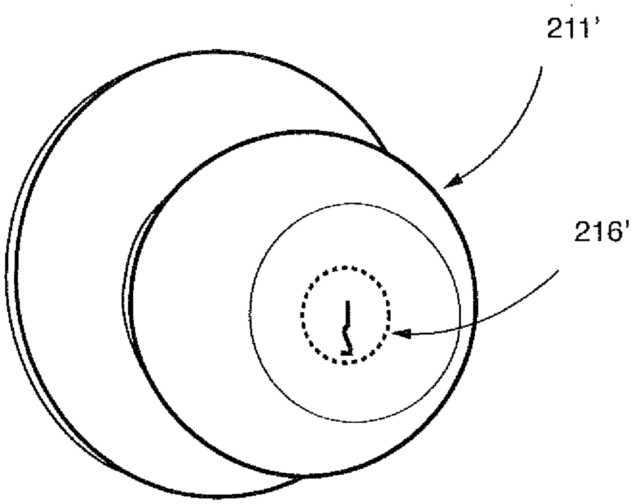
Figure 11:
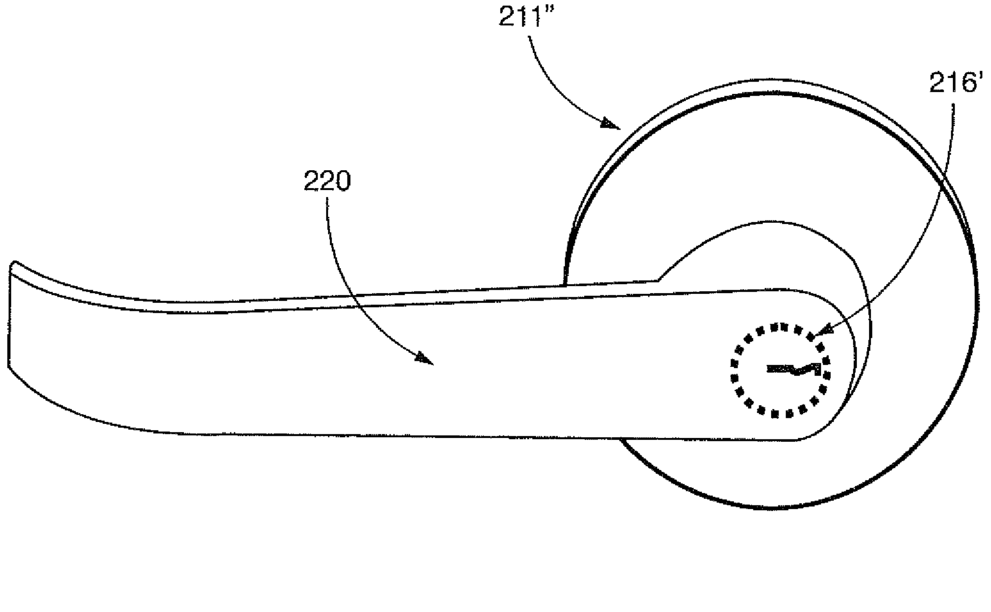
Figure 12A:
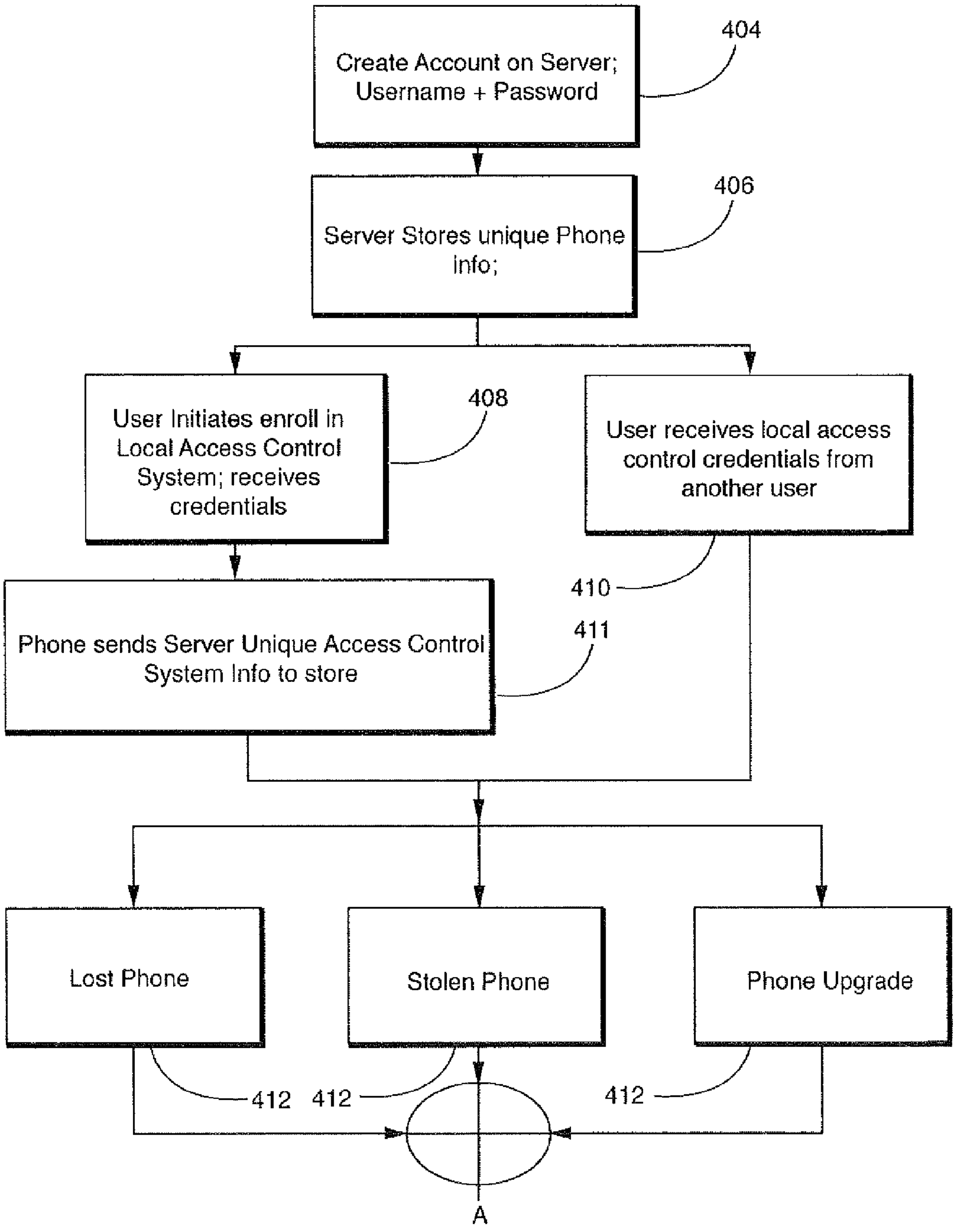
Figure 12B:
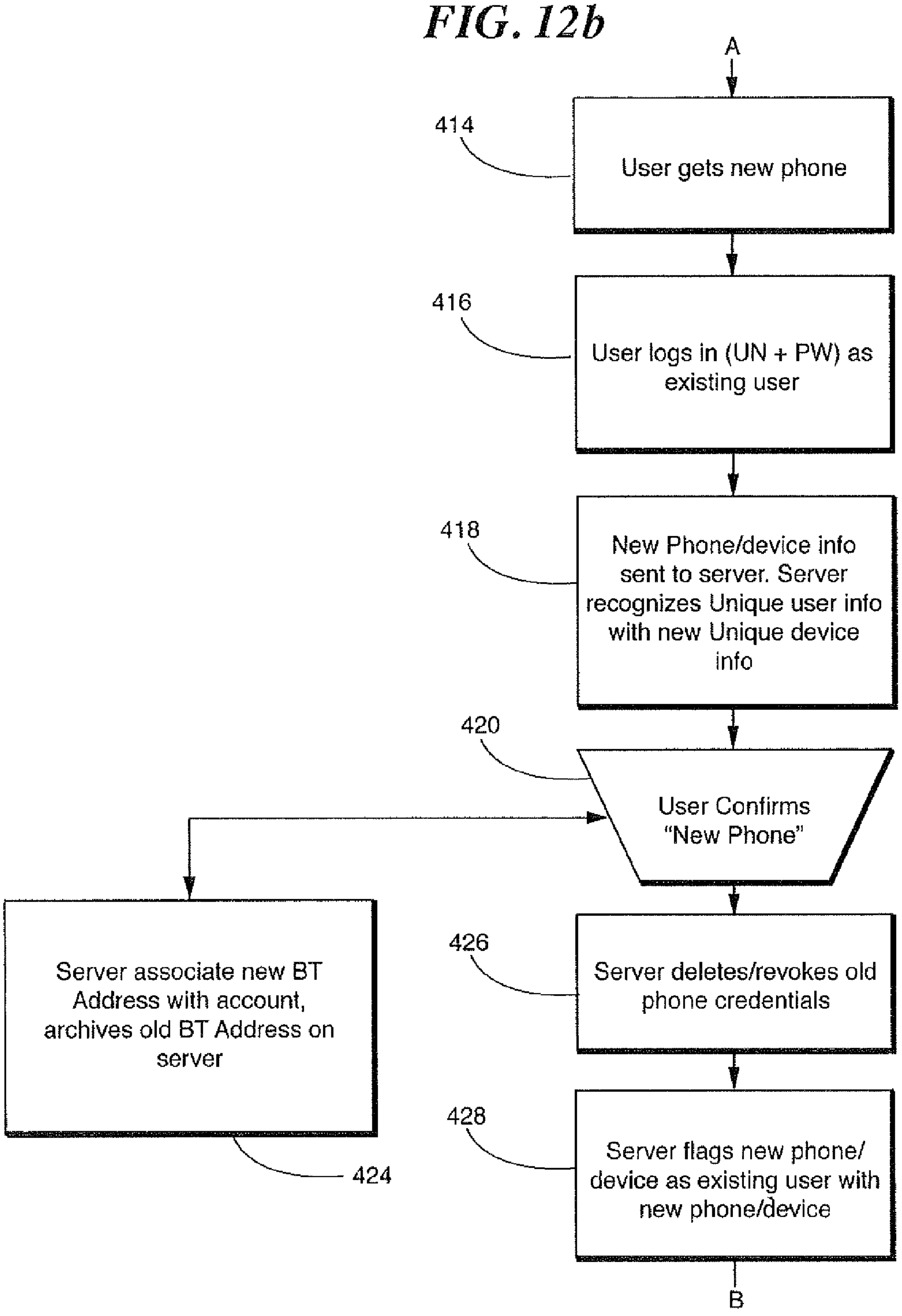
Figure 12C:
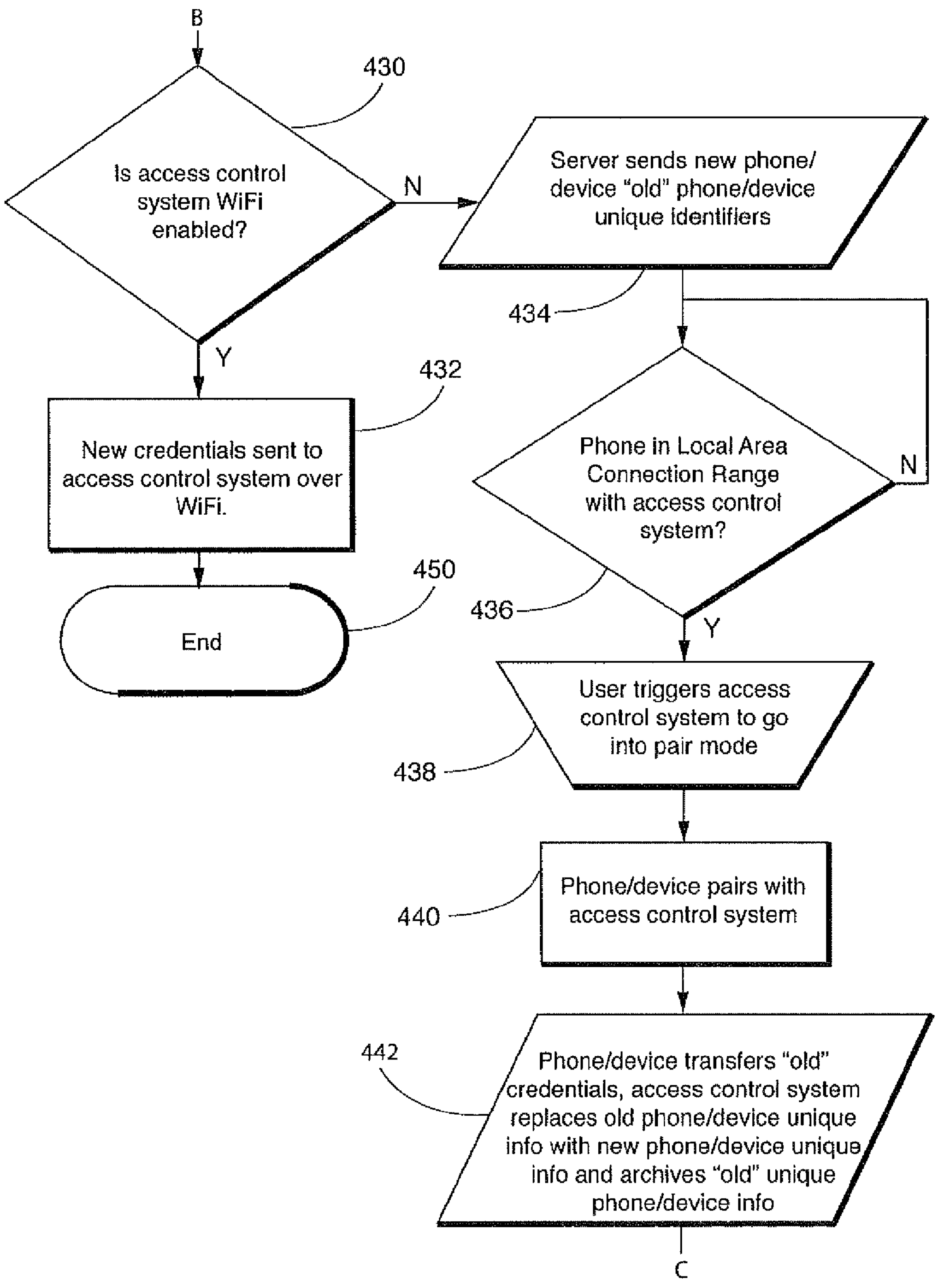
Figure 12D:
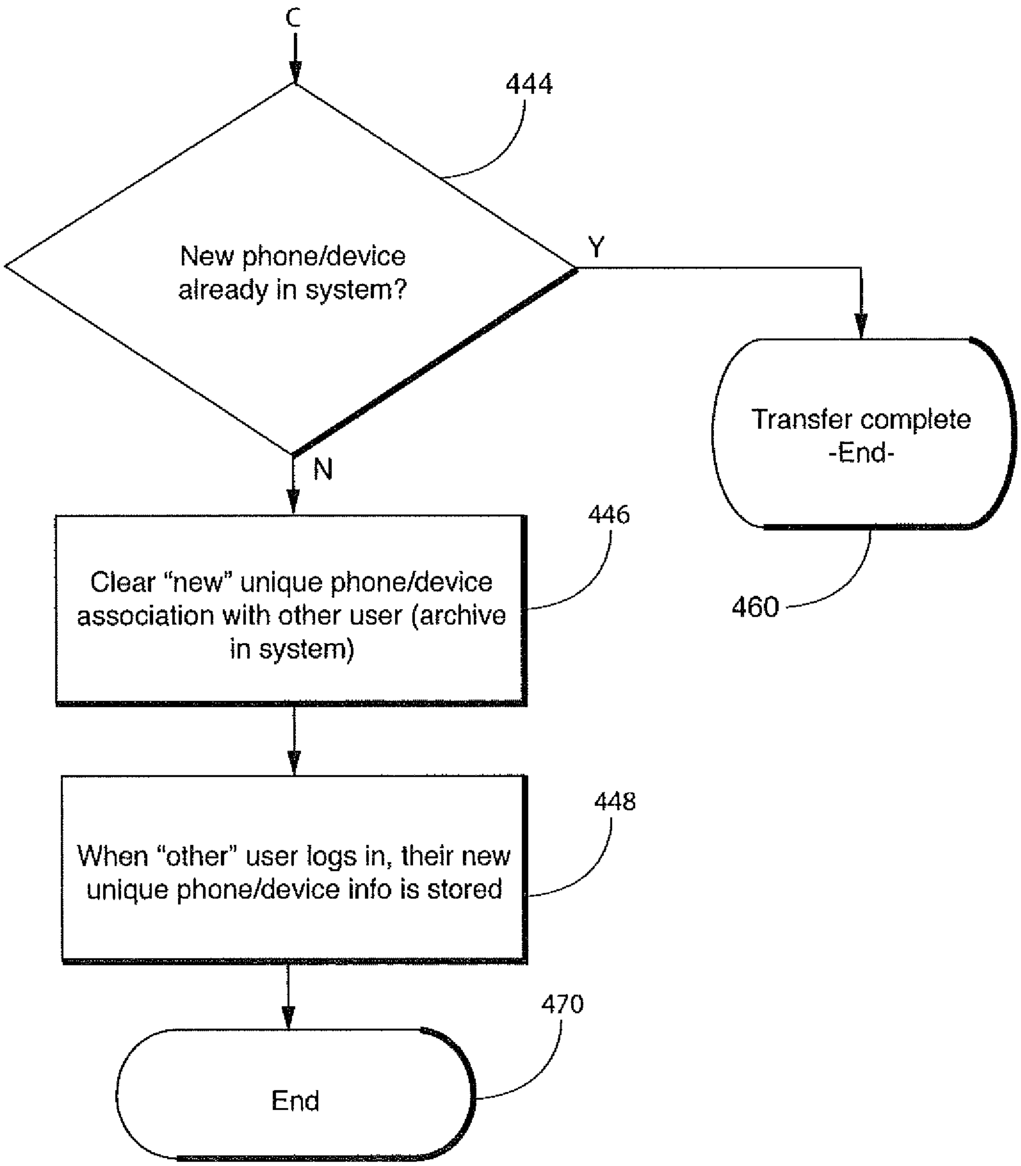
Figure 13:
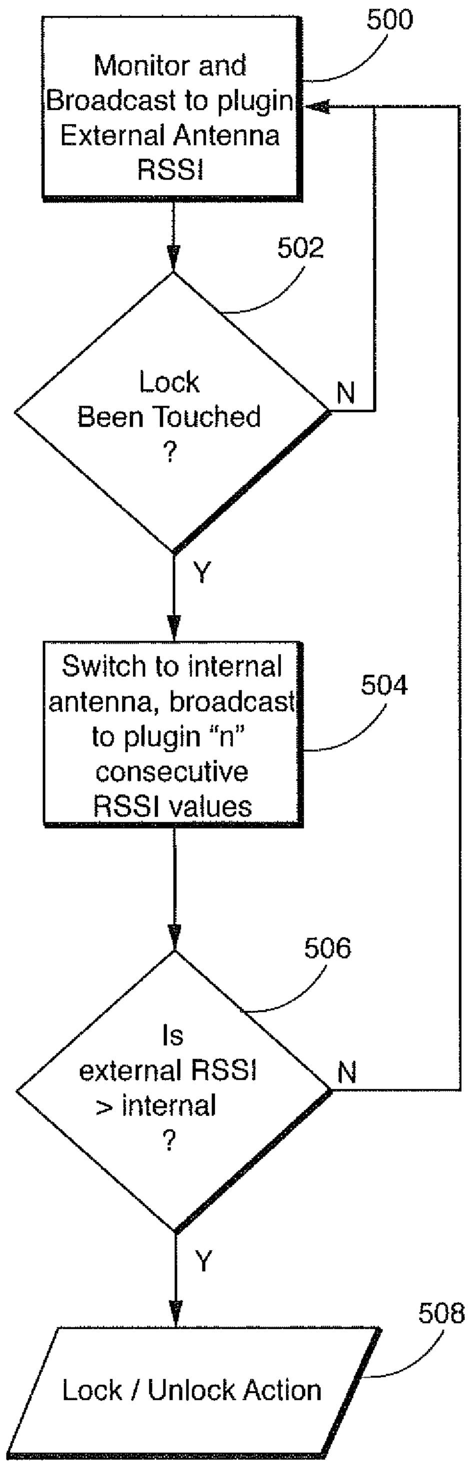

FIG. 7 is a schematic diagram of the communication between the components of the wireless access devices in accordance with another embodiment of the invention having an outwardly facing antenna, and an inwardly facing antenna;

FIG. 8 is a perspective view of a lock containing a visual condition indicator constructed in accordance with the invention;

FIG. 9 is a perspective view of a lock with a visual condition indicator constructed in accordance with another embodiment of the invention;

FIG. 10 is a perspective view of a lock with a visual condition indicator constructed in accordance with another embodiment of the invention;

FIG. 11 is a perspective view of a lock with a visual condition indicator constructed in accordance with another embodiment of the invention;

FIGS. **12*a-d* are a flow chart showing a method for replacing one remote access device with another in accordance with the invention; and FIG. 13** is a flow chart for operation of the inwardly facing antenna and outwardly facing antenna in accordance with the invention.

DETAILED DESCRIPTION OF THE INVENTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Figure 1:
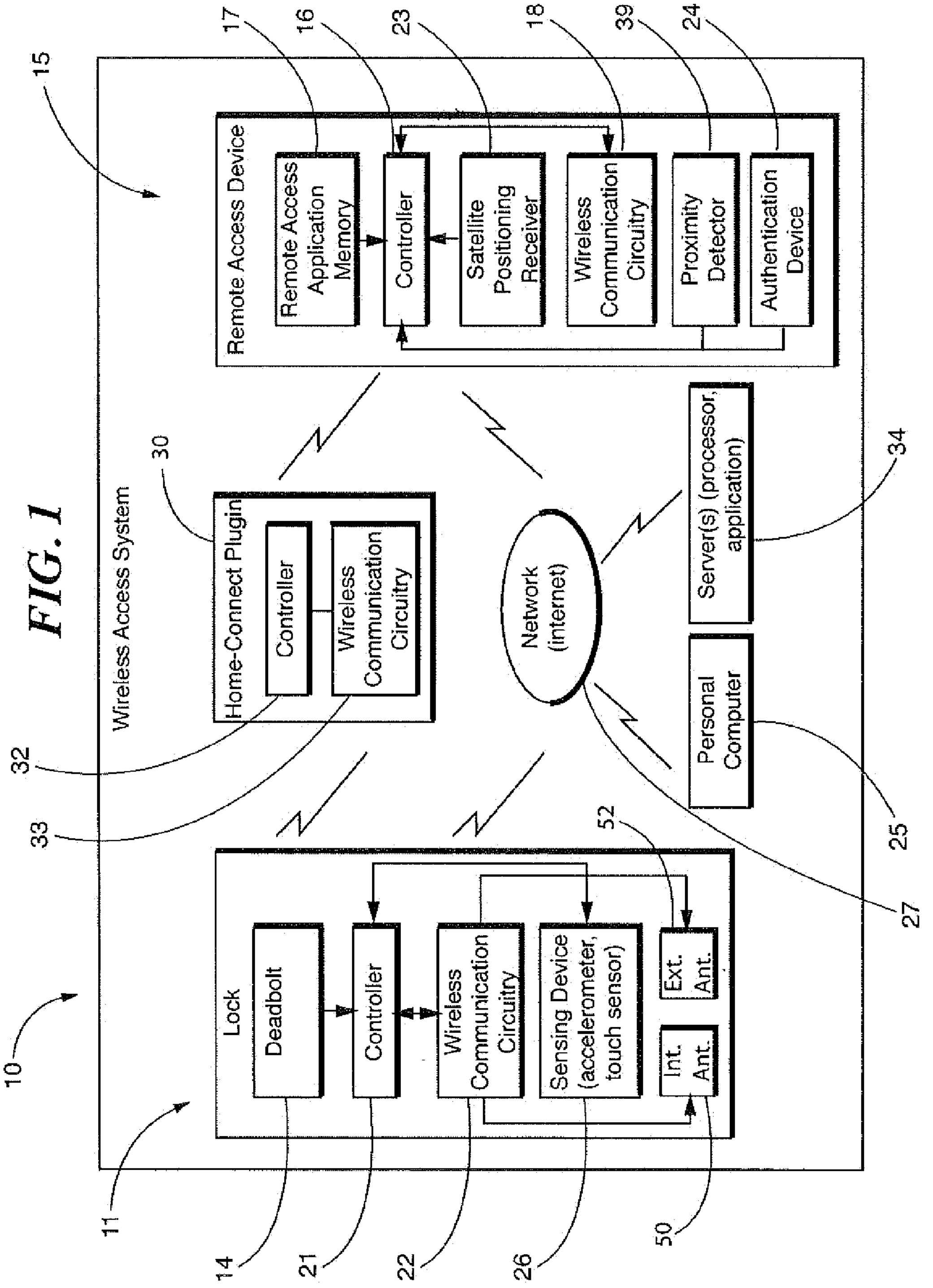
FIG. 1 is a schematic diagram of a wireless access system according to the present invention.
Figure 2A:
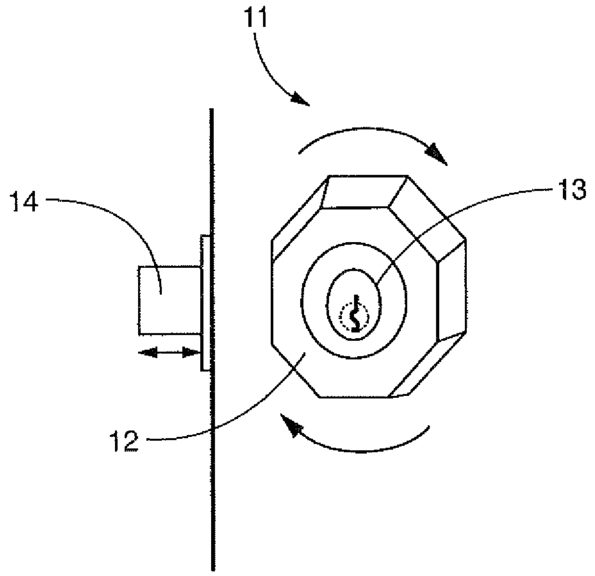
Figure 2B:
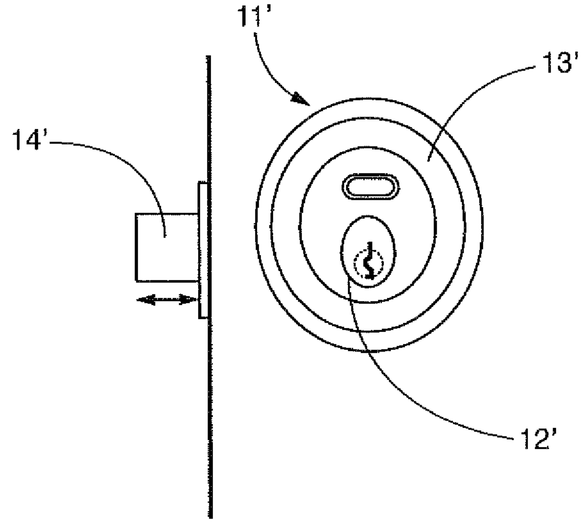

Referring to FIGS. 1, 2*a*, and 2*b*, a wireless access system 10, for example, a PKE system, includes a lock 11. The lock 11 may be installed in a standard deadbolt hole and may be battery powered, for example. The lock 11 may be a human controlled (keyed) lock, for example (FIG. 2*a*). The lock 11 includes an outer cylinder 12 that rotates freely around a standard key cylinder 13. When engaged, the cylinder 13 is linked to a deadbolt 14, thus giving the user control to extend or retract the deadbolt utilizing their key. The lock 11 includes a controller 21 or processor and wireless communication circuitry 22 for wireless communication which as will be discussed below, enable remote access device 15 to operate lock 11.

Alternatively, in another embodiment, the lock 11' may be motor powered (FIG. 2*b*). When a user is in sufficiently close vicinity or touches anywhere on the lock 11', the deadbolt 14' is driven by the motor (not shown) to open the lock for authorized users having the remote access device 15. Of course, the lock 11 may be another type of lock or locking mechanism and may be installed in any access point, for example.

Figure 3A:
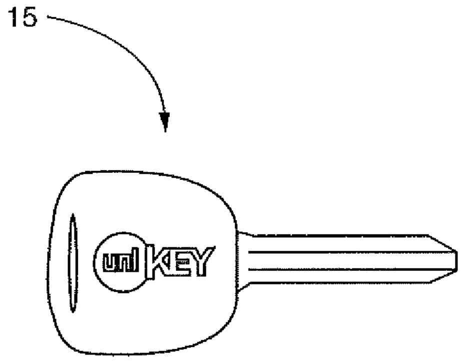

Referring now additionally to FIG. 3, the wireless access system 10 includes a remote access device 15. The remote access device 15 is advantageously a key or token configured to control the lock 11. In particular, the remote access device 15 may be a standard key including a remote controller 16 for controlling lock 11 and remote wireless access electronics coupled thereto (FIG. 3*a*). Remote access device 15 also includes wireless communication circuitry 18 for sending and receiving signals. In a preferred non-limiting example, the signal is a Bluetooth signal.

Figure 3B:
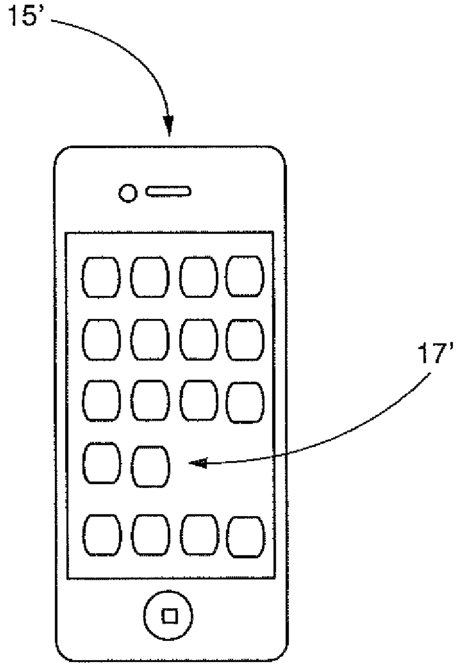

Alternatively, or additionally, the remote access device 15 may be a mobile wireless communications device, such as, for example, a mobile telephone that may include the remote wireless access electronics described above cooperating with an application 17' stored in memory 17 (FIG. 3*b*). The application 17' may be configured to send a signal to provide access and control over the lock 11', for example. Of course, more than one remote access device 15' may be used and may be another type of remote access wireless device, for example, a wireless FOB without the mechanical key, as will be appreciated by those skilled in the art.

Referring now additionally to FIG. 4, the wireless access system 10 also includes a home-connect plugin 30. A typical mains power outlet 31 is shown, with the home-connect plugin 30 plugged-into it. The home-connect plugin 30 includes a home-connect controller 32 and associated wireless communication circuitry 33 cooperating therewith and configured to communicate with the lock 11, and the remote access device 15.

The home-connect plugin 30 may also be part of a wireless local area network (WEAN) connectivity, for example, Wi-Fi connectivity, to link it to an off-site web-based server 34, for example. This advantageously enables the lock 11 to receive near real time updates for adding or removing users, one-time access, extended access or specific timed access, and other connectivity related updates and functions, as will be appreciated by those skilled in the art. Additional services may be selectively provided via the Internet using the WLAN connectivity provided by server 34, for example. While the home-connect plugin 30 is described herein as a plugin device, it will be appreciated by those skilled in the art that the functionality of the home-connect plugin 30 may be embodied in any of a number of form factors, for example.

Referring now additionally to FIG. 5, a typical residential setup example of the wireless access system 10 is illustrated. As described above with respect to FIG. 4, the home-connect plugin 30 is typically plugged-in to the mains power outlet 31, at a location in relatively close proximity, sufficient to communicate therewith, to the lock 11, which may be installed on the front door, for example. The remote access device 15 approaches from the outside of the home. Both the home-connect plugin 30 and lock 11 are configured to communicate with the remote access device 15 independently or simultaneously, as will be described below and appreciated by those skilled in the art.

The home-connect plugin 30 may be configured to approximately determine the position of the remote access device 15. In a preferred non-limiting embodiment, the home-connect plugin 30 periodically sends a signal to communicate with a remote access device 15. When remote access device 15 is within range to receive the signal, remote access device 15 outputs a return signal to home-connect plugin 30. Lock 11 may also receive the signal from remote access device 15, for example, by determining a received signal strength indication (RSSI), and/or by determining, based upon an algorithm of the home-connect plugin 30, that the remote access device 15 is approaching and is within a defined range.

In one non-limiting exemplary embodiment, lock 11 is in a hibernation or low power level state. Upon determining that the remote access device is within a predetermined distance, the home-connect plugin may send a wakeup signal to the lock 11. In this way, home-connect plugin 30 may be configured to have an extended range capability, for example, 100 or more meters. The lock 11 has a smaller range, for example, of about 10 meters, but may be greater in some cases. Therefore, the home-connect plugin 30 may communicate with the remote access device 15 before the lock 11. Thus, the home-connect plugin 30 may send a signal to the lock 11 to wake up and start communicating with the remote access device 15 to save battery life, for example. By causing remote access device 15 and lock 11 to communicate only in response to a signal from home-connect plugin 30, the battery life of lock 11 and remote access device can be extended.

Additionally, the home-connect plugin 30 may establish a communication link with the remote access device 15 in advance, for example, thus increasing the speed of the authentication process to create little if any perceived delay for the user. Once the lock 11 is woken up by the home-connect plugin 30 and connected to the remote access device 15, both the home-connect plugin and the lock track the RSSI of the remote access device until the algorithm determines it is within a defined accessible range from lock 11. Both the home-connect plugin 30 and the lock 11 gathering RSSI data together may utilize this data in an algorithm to determine the position of the remote access device 15 with greater accuracy than either the home-connect plug in 30 or lock 11 alone. Once the remote access device 15 is within the determined accessible distance, the home-connect plugin 30 grants remote access device 15 access control to the lock 11. More than one home-connect plugin 30 may be used in some embodiments for more accurate position determining, and to increase authorized user capacity and overall speed of the wireless access system 10.

Operation of the wireless access system 10 will now be described with reference additionally to the flowchart in FIG. 6. The lock 11, may initially be in a sleep mode to conserve battery power, for example. The home-connect plugin 30 is typically powered on and searching for authorized remote access devices 15, i.e. token(s), the standard key, and/or the mobile wireless communications device, in range in a step 100. In one preferred non-limiting embodiment, authorization is established by syncing the Bluetooth identifier of remote access devices 15 and home-connect plugin 30 as known in the art. The home-connect plugin 30 establishes an asynchronous communication link, (ACL) connection. In this way the system is self authorizing at it only recognizes components with which it has established a connection.

The authorized remote access device 15 enters the home-connect plugin 30 broadcast range in a step 102. Once the home-connect plugin 30 finds an authorized remote access device 15 in range, it establishes connection in a step 104 and begins to monitor the RSSI of the return signal from remote access device 15 to estimate its position.

In a step 106, it is determined whether remote access device 15 remains in range of the home-connect plugin 30 if not the process returns to step 100 to begin again. If yes, then home-connect plugin 30 calculates whether remote access device 15 is approaching and whether it enters the lock wake-up range in step 108. If not, step 106 is repeated. Once the home-connect plugin 30 estimates that the remote access device 15 has entered the defined wake-up range in a step 108, it sends a wake-up and connection signal to the lock 11 in a step 110.

In a step 112 it is determined whether lock 11 wakes up and sends confirmation to home-connect plugin 30. If not, the wake-up signal is repeated in step 110. Once the lock 11 wakes up, it also establishes a low level connection with the remote access device 15 in a step 114, and begins to monitor the RSSI of the remote access device 15 or devices if there are more than one. Both the home-connect plugin 30 and the lock 11 are monitoring RSSI to more accurately determine the position of the remote access device 15 in a step 118. This computing may be performed by a processor or controller 32 included within the home-connect plugin 30, the controller 21 within lock 11, or both. The home-connect plugin 30 and the lock 11 determine whether the remote access device is within the determined accessible distance in step 116. It is determined whether the home-connect plugin 30 and lock 11 calculate the remote access device 15 is within the control range. If not, the determination is again made in step 116; if yes, then the user is granted authorization to the lock 11, and the deadbolt 14 becomes controllable in a step 120, either extending or retracting per the user's action.

If the remote access device 15 is not within the wake-up range of lock 11, then lock 11 goes back to sleep or a low power mode, in a step 122.

Additional and/or alternative functions of the wireless access system 10 will now be described. Reference is now made to FIGS. 8-11 wherein a lock constructed and operated in accordance with another embodiment of the invention is provided. Like numbers are utilized to indicate like structure. The primary difference in this embodiment being the inclusion of the visual indicator at an easily and readily seen position on the lock to indicate a system condition to the user as they approach the lock.

As seen in FIG. 8 a deadbolt lock 211 includes a visual indicator 216. In a preferred but non-limiting embodiment, visual indicator 216 is a selectively controllable light in the form of a circle having a diameter substantially equal to the diameter of the cylinder of deadbolt lock 211. In a preferred embodiment, visual indicator 216 is a light emitting diode (LED) formed as a circular light pipe. In a preferred but non-limiting embodiment, visual indicator 216 is capable of indicating two or more visual conditions such as two or more colors, static versus flashing, in illuminate or non-illuminate, in order to indicate at least two distinct conditions.

Visual indicator 216 may be controlled by either one of onboard controller 21 or home-connect plugin controller 32. In a preferred embodiment, controller 21 which controls lock 211 is in communication with and controls audiovisual indicator 216.

In this way, when lock 211 determines that the remote access device is within a determined accessible distance such as in step 116 above, the state of audiovisual indicator 216 is changed either from dormant to illuminated, from a first color such as red indicating locked, to a second color such as green indicating open, or from a static state color to a flashing illumination. What is required is a change in condition/state of the illuminating device in response to a recognition that the remote access device is within a predetermined distance to allow control of the lock 211.

Positioning a visual indicator 216 at the circumference of the face of the lock 211 is given by way of example only, as shown in FIG. 9. Visual indicator 216' may merely encircle the actual key hole for the lock as seen in FIG. 10. In a doorknob spring lock embodiment, a doorknob 211' includes visual indicator 216' which surrounds the key hole. Lastly, in a lever embodiment 211" as shown in FIG. 11, having a handle 220 also includes a visual indicator 216' surrounding the key hole.

Furthermore, visual indicator 216 may indicate that a lock is in a lock/unlock state, is accessible to be opened utilizing touch sensor 26, as described above, but may also be used to indicate an error in operation utilizing a third type of visual indicator (color yellow flashing at a different rate), that lock 211 is capable of being programmed or is in the process of being programmed. Different indicators as expressed by visual indicator 216 may even indicate different steps in a lock or unlocking process, or as confirmation of the completion of different steps during a programming process.

In addition to informing the user that they are in the control range, visual indicator 216 can change its indicating state by a single touch sensed at touch sensor 26. By way of example, the user touches lock 211 at a position 215 or 219 to unlock lock 211 and visual indicator 216 turns green. The user may again touch lock 211 to lock lock 211 and changing the state exhibited by audiovisual indicator 216 from green to red.

In another embodiment, with respect to an independent function, plugin 30 may notify lock 10 at a low energy level that the home-connect plugin 30 has lost power, the lock 11 may be configured to have a change of status to wake up in the absence of the signals from plugin device 30, or to be woken up by a user's touch and approximately determine the position of the user by itself, as well as authenticate the user in a manner similar to that described in connection with plugin device 30. In another embodiment, plugin 30 continuously pings lock 10 at a low energy level and if plugin 30 goes offline, lock 11 may be configured to have a change of status to wake up in the absence of the signals from plugin device 30, or to be woken up by a user's touch and approximately determine the position of the user by itself, as well as authenticate the user in a manner similar to that described in connection with plugin device 30. In an embodiment in which the remote access device is a smart phone, tablet, or similar device, home-connect plugin 30 may also request the user to verify their access control request by prompting them for an action or code on their remote access device 15', for example, via a display on their mobile wireless communications device.

The wireless access system 10 may include a calibration feature. More particularly, a connection between the home-connect plugin 30 and the lock 11 may be used by the algorithm to calibrate the RSSI input to adjust for changes in environmental conditions, for example. In one non limiting example, plugin device 30 determines RSSI values for remote access device 15 over a number of distinct communications. It then determines a maximum average in range value in which communication between plugin device 30 and remote access device 15 occurs and a minimum average in range value at value in which communication between plugin device 30 and remote access device 15 occurs. In this way, the distances at which plugin 30 begins communicating with remote access device 15 self adjusts as a function of local conditions.

The wireless access system 10 may include an additional positioning input feature. The remote access device 15 may have an accelerometer which can be utilized to determine the orientation of the remote access device 15, which can be transmitted to system 10, for example by Bluetooth low energy. This orientation information can be utilized in conjunction with the received signal strength to better determine the remote access device 15 position. This is useful as received signal strength can vary based on orientation even if the position of the device 15 does not change.

In a process to revoke a key where the key is a smart phone, tablet or the like, once a user decides to revoke a key code, the user may send a termination request to home-connect plugin 30 or to the remote access device key 15' being revoked. If there is no response, the request is broadcast to users, for example, all users, in the “approved” network (i.e. users enrolled in the same lock). The request is stored in the background on their respective keys. Then when any authorized user is in range of the lock 11, the key code is revoked from the lock, denying access to the revoked user.

The wireless access system 10 may also include a computing device 25, for example, a personal computer at the user’s residence for use in the revocation process. The computing device 25 may include circuitry for wirelessly communicating with the home-connect plugin 30, remote access device 15, and/or lock 11 for revoking the permission. For example, the computing device 25 may include Bluetooth communications circuitry, for example. Other devices and communications protocols may be used in the revocation process.

While the wireless access system 10 is described herein with respect to a door, the wireless access system may be used for access control or protection of, but not limited to, appliances, heavy machinery, factory equipment, power tools, pad locks, real estate lock-boxes, garage door openers, etc., for example. Alternative remote access device 15 embodiments may include a pen, watch, jewelry, headset, PDA, laptop, etc., for example. The wireless access system 10 may be used to protect other devices or areas where it may be desired to restrict access.

With respect to power conservation and increased security methods for the remote access device 15, and more particularly, a mobile wireless communications device 15', for example, that may include the remote access application and a global positioning system (GPS) receiver 23, the GPS receiver may be used to track the location relative to the lock’s position and enable communication by remote access device 15 only when within range. If the remote access device 15, i.e. mobile wireless communications device 15' is outside the range, as determined by the GPS receiver 23, it may not transmit, go into sleep mode or turn off. Additionally, or alternatively, the location of the mobile wireless communication device 15' may be determined via triangulation with wireless service provider base stations or towers, for example.

Alternatively, or additionally, the remote access device 15 or mobile wireless communications device 15' may wake up, determine a position, calculate a fastest time a user could be within range of the lock 11, then wake up again at that time and recalculate. When the user is within the range, it may enable the remote access application 17, and, thus communication for authentication or other purposes.

The wireless access system 10 may be used to augment multi-factor authentication, e.g. use with a biometric identifier, personal identification number (PIN) code, key card, etc. The wireless access system 10 may also allow simultaneous multiple authentication of remote access device, for example, mobile wireless communications devices. More particularly, the wireless access system 10 may require a threshold number of authorized remote access devices 15 to be present at a same time for authentication to succeed.

The wireless access system 10 advantageously may provide increased security, for example. More particularly, the wireless access system 10 may force the user to authenticate in addition to authorization, via the remote access device 15 before the door can be opened. For example, the remote access device 15 may include an authentication device 24 for authentication via a biometric, password, PIN, shake pattern, connect-the-dots, or combination thereof, for example, prior to accessing the lock 11. In the case of the remote access application 17 on a mobile wireless communications device, for example, the application may have multiple security levels to enable these features, as will be appreciated by those skilled in the art.

With respect to security features, by using proximity sensors, switches, or the like, the wireless access system 10 may indicate whether a user locked the door, for example. When a user locks the door, for example, the remote access application 17 may log “Lock” with a time stamp so that it may be tracked and checked on the remote access device 15, i.e. the mobile wireless communications device, for example. The wireless access system 10 may include a sensing device 26 for example, an accelerometer to track door openings, for example. Based upon the accelerometer, data may be provided through the application or via the Internet or other network, for example. The sensing device 26 may be another type of device, for example, a touch sensor.

In one advantageous security feature, when the door is opened, or an attempt is made to open the door, which may be detected by the accelerometer 26 or other door opening determining methods, as will be appreciated by those skilled in the art, known, and even previously revoked, remote access devices 15 in range and/or discoverable devices, may be recorded along with a time stamp. This may capture an unauthorized user, for example.

Another advantageous feature of the wireless access system 10 may allow authorized visits, for example. More particularly, an authorized visit may be enabled by a 911 dispatcher or other authorized user to allow special or temporary access by the smart phone of a normally unauthorized user, for example. The wireless access system 10 may keep a log/audit trail. Approval may be granted by trusted a friend or special authority, for example, emergency medical services, a fire department, or a police department.

The wireless access system 10 may also include a security feature whereby when a threshold time has elapsed, the wireless access system may ignore a remote access device 15 in range. This advantageously reduces or may prevent unauthorized access that may occur from leaving a remote access device 15 that is authorized inside near the door. A timeout function (via a timer, not shown) may additionally be used in other undesired entry scenarios. The wireless access system 10 may also log all rejected pairing attempts, as will be appreciated by those skilled in the art.

The wireless access system 10 may also include a revocable key security feature. For example, the wireless access system 10 may include both revocable and non-revocable keys. If, for example, the wireless access system 10 is unable to access the server 34 to verify keys, for example, the wireless access system may force the application 17 on the remote access device 15, for example, to check the servers. If the wireless access system 10 is unable to connect or verify the keys, access is denied.

For example, the revocable key feature may be particularly advantageous to keep an old boyfriend, for example, who is aware that his key is being revoked from being able to turn off his remote access device 15 so that the key is not deleted. However, a wireless connection for the remote access device 15 may be a prerequisite to access in some instances.

As will be appreciated by those skilled in the art, the wireless access system 10 has the ability to transfer a key from one remote access device 15 to another with the remote access application 17, for example. It may be desired that these keys be revocable in some configurations. However, if the remote access device 15 with the key to be revoked is not accessible via the network 27, then revocation may not be guaranteed if the lock 11 is offline, for example. The wireless access system 10 advantageously addresses these challenges.

In addition, to adding or removing access, it is contemplated, particularly where the remote access device is a cell phone, that a user does not retain a remote access device forever. They may be lost, stolen, or changed for an upgrade by way of example and the replacement device must be paired with the lock. Reference is now made to FIGS. 12*a*-12*d* in which an embodiment of the invention for changing the remote access device of a particular user is provided. In a step 404, at the very beginning of the initialization for a new user of the system; to join a phone remote access device 15 by way of non-limiting example, to the system, an account is created on server 34, either a local server such as the processor discussed above, or in the preferred non-limiting embodiments, remote access server 34. An account ID and at least a user name and password are stored at server 34 in a step 404. Server 34 also stores phone identification information such as a bluetooth address as communicated by the phone, a phone number and any other phone identification information such as SIM card information, or the like in a step 406.

In a step 408, the user initiates the local access control system 15 as discussed above by communicating with either the controller of home-connect plugin 30 or lock 11. As discussed above in step 410, the remote access device 15 may receive its access control information or "key" as transferred from another remote access control device 15. In a step 411, the remote access device 15 sends the paired lock information to server 34 so that server 34 now maps to this particular account, the phone identifier, the bluetooth information, and the lock information. The server, either local server 34 or a remote server communicating across the internet, stores the access control system identification information, the pairing of the pass key, the ("K") code and the like, which matches the remote access device 15 to the remote access control system, and the types of control and operation. The system then operates as discussed above.

However, as often occurs as in a step 412, the remote access device (particularly a phone) is either lost, stolen or changed. However, each phone has its own unique bluetooth address and other phone identification information, and therefore, in a preferred embodiment, each remote access device 15 has its own identifier recognizable by lock 11 and home-connect plugin 30. System 10 requires an ability to equally recognize users with new remote access devices. Because the unique bluetooth identifier of each remote access device 15 is used as part of the recognition and access algorithm in a preferred non-limiting embodiment as discussed above, a new remote access device 15 requires repairing with lock 11.

In step 414 a new remote access device 15, a phone in this non-limiting exemplary embodiment, having its own phone identification information such as a bluetooth address is obtained. Utilizing the phone, the user enters account login information to server 34 in a step 416. Server 34 utilizes the login information to determine that the new phone bluetooth address and phone identification is for an existing account, as the phone number travels with the communication in a step 418. Server 34 sends a message to the phone asking whether it is in fact a new phone in the step 420 and the user confirms the status of the new phone.

In a step 424, server 34 associates the new phone bluetooth address with the existing account and archives the old bluetooth address on server 34 At the same time, or immediately before or immediately after, in a step 426, server 34 revokes the old phone credentials (phone ID information, bluetooth address) from the account. Server 34 stores the new remote access device information associated with the existing account.

It is then determined in a step 430 whether or not the local lock system for that particular user is WiFi enabled. If yes, then in a step 432 the new credentials are sent to the local controllers 21, 16 over a WiFi network or other local communication network as the new credentials are paired with the lock 11, the process is ended in a step 450.

If the system is not WiFi enabled, then in a step 434 server 34 sends the unique identifiers of the old remote access device 15 to the new remote access device to be temporarily stored thereon. In a step 436 it is determined whether or not the remote access device 15 in the form of the phone is within local area connection range, i.e. within range to communicate with either one of controller 32 of the home-connect plugin 30 and/or controller 21 of lock 11. Step 436 is repeated until remote access device 15 is within range. Once within range, the user triggers the access control system to enter a pairing mode in a step 438 so that in this way, the lock 11 recognizes a local access device 15 and the user. Even though, it is not equipped to communicate with server 34, because of the use of the old phone identifying information, it knows it is communicating with a trusted remote access device 15. The phone (remote access device 15) pairs with the access control system in a step 440 and the phone transfers the old bluetooth address credentials to either control lock 16 or controller 21. In a step 442, system 10 updates the bluetooth address stored at lock 11 and home-connect plugin 30 with the new phone bluetooth address and phone identifier information and archives the old bluetooth address in a step 442.

In a step 444, it is confirmed whether the new phone is already in the system. If it is in the system, then the process ends in a step 460. If it is not in the system, then the processor 34 clears the new bluetooth address associated with another user so in step 446 that when the user logs in with their new bluetooth address the current remote access device information is stored in a step 448, in effect phone swapping. The process is then ended in a step 470.

For the purpose of enrolling an administrator, the first user, or other users, the system can utilize a tap proximity method as an alternative to a PIN or password. In the case of a newly installed system, the system may be vulnerable to unauthorized enrollment. It becomes convenient and secure to require the user to simply tap their device 15, that they wish to enroll, to the wall plugin unit 30 or the inside of the lock 11, to prevent outside unwanted users from enrolling in the system.

A proximity detection feature may be included in the wireless access system 10, and more particularly, the remote access device 15 may use a magnetic field sensor 39, such as, for example, a compass in mobile wireless communications device, as a proximity sensor to obtain a more uniform approach/departure distance calibration. A magnetic pulse or pulse sequence may be used in the lock 11 to illuminate a magnetic flux sensor in the remote access device 15 to establish proximity.

Additionally, the remote device 15, for example, a mobile wireless communications device or mobile telephone, may be qualified using both radio frequency (RF) and audio, for example. The remote access device 15 may be a source or sink of audio to help qualify proximity.

In another embodiment, as an alternative to a human driven lock, as noted above, a turn-tab (not shown) may be included that will "flip out" of the front of the lock 11 when pressed to allow the user to turn the lock on an un-powered deadbolt 14. It may be desirable that the surface area be no larger than a standard key, for example. The user pushes the turn-tab back into the lock face when done. The turn-tab may alternatively be spring loaded, for example.

In another embodiment, the turn-tab (not shown) may be added to a powered lock, for example the lock 11 described above. This is may be useful to help force 'sticky' locks, for example, as will be appreciated by those skilled in the art. This may also allow the user to give a manual assist to the motor in case of a strike/deadbolt 14 misalignment. This may also allow for operation in a low battery situation, for example. The turn-tab may be particularly useful in other situations.

Additionally, one of the deadbolts may have a traditional key backup as it may be needed for emergencies, for example, while the remaining deadbolts on a house may be keyless. This may eliminate the need to match physical keys on multiple deadbolts, and may reduce the cost for additional deadbolts.

The wireless access system 10 may also include an additional access feature. For example, with the home-connect plugin 30 connected to the Internet through server 34 and/or personal computer 25, for example, it may be possible to have the lock 11 unlock via a command from the wireless access system. In other words, the lock 11 could be opened for users who don't have a remote access device 15. More particularly, they could call a call center or service that could unlock the lock 11 via the Internet 27, for example, or via other wireless communications protocol. Also, an authorized user could provide this action as well. Additionally, fire/police could gain access by this method if the lock owner opts-in to this service. As will be appreciated by those skilled in the art, alternatively, a command could be sent from the remote access device 15.

The wireless access system 10 may also include an activation indication. For example, the remote access device 15 can signal the operator via an auditory tone, vibration or other indication when the lock is activated. This may help communicate actions to the user to reduce any confusion.

The wireless access system 10 may also include an additional security feature. For example, the wireless access system 10 may use an additional authentication channel, for example, via a WLAN, WiFi, or other communication protocol, either wired or wireless, with the remote access device 15. This may improve authentication and make spoofing considerably more difficult, as will be appreciated by those skilled in the art.

As another security feature of the wireless access system 10, if cell service and data service, for example, if the remote access device 15 is a mobile phone, are turned off, remote access application may consider this a threat related to key revocation and authentication may not be approved. Also, the lock 11 may include a radar device, or a radar device may be coupled adjacent the lock to detect the locations of the entrant by facing outward in its sweep to resolve inside/outside ambiguity, for example. If the radar does not detect an entrant, then by default the holder of the remote access device is inside and the lock is not activated. The radar may be enabled when the lock 11 is woken up by the home-connect plugin 30 to conserve power.

Reference is now made to FIGS. 5, 7 and 13 in which an embodiment of the invention having a lock 11 which includes an interior facing directional antenna 50 and a an external facing directional antenna 52 (schematically shown). Each is operatively coupled to wireless communication circuitry 22 to send signals to, and listen for signals from, remote access device 15. If interior facing directional antenna 50 communicates with remote access device 15, lock 11 and in turn system 10 determine that remote access device is inside the home, dwelling or structure. If exterior facing directional antenna 52 communicates with remote access device 15, system 10 determines that remote access device 52 is outside of the dwelling and operates as discussed above. Home-connect plugin 30 compares the signals from interior facing directional antenna 50 and exterior facing directional antenna 52 to confirm the location of remote access device 12 prior to enabling remote access device 15 to control lock 11. This prevents the door from unlocking each time someone within the structure passes by the lock.

During operation, as user 70 approaches lock 11, external antenna 50 communicates with remote access device 15 and its signal to determine an external RSSI in accordance with a step 500. As user engages lock 11 or an associated door knob, sensor 26 detects whether or not lock (or knob 300) has been touched in a step 502. If not, then step 500 is repeated and the external antenna RSSI is monitored.

If the lock 11 has been touched, then controller 21 at lock 11 switches the operation antenna to the use of an internal antenna 52 to broadcast to home-connect plugin 30 and determines a predetermined number of consecutive RSSI values. In a step 506 it is determined whether the outside RSSI is greater than the inside RSSI. If it is, then the system determines that the authorized user is outside the dwelling and lock 11 operates to either locked or unlocked in a step 508. If the outside RSSI is determined to be less than the inside RSSI in step 506, then the user 70 is inside of the dwelling and the process returns to step 500 where the outwardly facing antenna is utilized. This is important as the user would not want the system to be controlled from the outside by their access device 15 if they are on the inside. In other words, this use of both the interior and the exterior facing antennae, prevents the system from being fooled i.e., being unlocked by an unauthorized user on the outside if the authorized remote access device 15 is near the door on the inside.

In another embodiment, lock 11 may make use of sensor 26 to allow users not authorized to lock the passive key entry system 10, such as house guests, a service worker, or the like, which may receive permission to enter, but had been asked to lock the door as they leave. In one embodiment, the guest, service worker, or the like simply touches the lock 11 for an extended period of time greater than an inadvertent brushing of the lock so that sensor 26 confirms the lock has been touched at the exterior of the lock in the absence of an authorized remote access device 15, When this combination is determined to be present by the controller the door locks. In another embodiment, multiple touches to sensor 26 embedded within lock 11 may cause, in the absence of an authorized remote access control device, locking of the door.

A variation on this process can be utilized to remind the user they have forgotten their authorized remote access device 15. Controllers 21, 32 may be programmed to recognize that upon recognition of a remote access device, a single touch at sensing device 26 allows control to the user to either lock or unlock lock 11. If the user touches the lock 11 a single time and locking does not occur, this can act as a reminder that they have forgotten the remote access device. Furthermore, controller 21 could control the visual display 216 and the like to indicate the open or locked condition to user 70 so that they may recognize that the lock is not acting in accordance with expectations because of the absence of the remote access device 15.

A mechanical or zero/low-power tilt sensor may be configured to detect break-in events, for example to the lock 11 eased upon a detected break-in, the lock 11 activate and thereafter communicate to home-connect plugin 30 to report an intruder alert. The lock 11 may also store information, in a memory, for example, if home-connect plugin is off-line.

Radar or other motion detector device (not shown) may also be added to the home-connect plugin 30 to assist with inside/outside determination and break-in monitoring. The radar or other motion detector may be used in conjunction with an alarm system, as will be appreciated by those skilled in the art.

Indeed, while the different components of the wireless access system 10 have been described with respect to a wireless protocol, it will be appreciated by those skilled in the art that the components may communicate via a wired network and protocols or a combination of wired and wireless networks. Additionally, while Bluetooth and WLAN (i.e. WiFi) has been described herein as wireless protocols of particular merit, other wireless protocols may be used, for example, Zywave, ZigBee, near field communication (NFC), and other wireless protocols.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the invention.

What is claimed is:

1. A wireless access control system for a door, the wireless access control system comprising:

a lock assembly carried by the door and comprising
a lock,
lock wireless communications circuitry, and
a lock controller coupled to said lock and said lock wireless communications circuitry, and configured to switch the lock between a locked position and an unlocked position;

a plugin device remote from said lock and comprising
plugin device wireless communications circuitry, and
a plugin device controller coupled to said plugin device wireless communications circuitry; and a remote access device remote from said lock and comprising
remote access wireless communications circuitry, and
a remote access controller coupled to said remote access wireless communications circuitry and configured to cooperate with said remote access wireless communications circuitry to wirelessly transmit a remote access command to said plugin device for switching said lock between the locked and unlocked positions;

said plugin device controller configured to
determine a first distance between said remote access device and said lock based upon wireless communication therewith,
determine when said remote access device is within a second distance from said lock, the second distance being closer to said lock than the first distance, and
wirelessly send a lock communication enable command to enable said lock based upon said remote access device being within the second distance from said lock;

said lock controller configured to
communicate with said remote access device independently from said plugin device based upon wirelessly receiving, via said lock wireless communications circuitry, the lock communication enable command from said plugin device, and
switch said lock between the locked and unlocked positions based upon wirelessly receiving, via said wireless communications circuitry, the remote access command from said remote access device and authentication of said remote access device.

2. The wireless access control system of claim 1, wherein said lock assembly further comprises a visual indicator adjacent said lock, and wherein said lock controller cooperates with said visual indictor to indicate a status of said lock.

3. The wireless access control system of claim 2, wherein said lock controller is configured to selectively change said visual indictor when said remote access device moves across the second distance.

4. The wireless access control system of claim 2, wherein the status of said lock comprises at least one of an awake state, a hibernation state, a lock state, an unlock state, and programming state.

5. The wireless access control system of claim 1, wherein the visual indicator comprises a light emitting diode.

6. The wireless access control system of claim 1, wherein said lock comprises a lock cylinder for receiving a key therein and a lock strike coupled to said lock cylinder, and wherein said visual indicator is carried around said lock cylinder.

7. The wireless access control system of claim 1, wherein said plugin device further comprises a plugin device housing and a plugin device power connector carried by said housing for coupling to a mains power receptacle.

8. The wireless access control system of claim 1, wherein said lock controller is configured to switch said lock between the locked and unlocked positions based upon wirelessly receiving, via said wireless communications circuitry, the remote access command directly from said remote access device.

9. The wireless access control system of claim 1, wherein said lock assembly comprises at least one antenna coupled to said lock wireless communications circuitry, and wherein said lock controller is configured to enable switching of said lock between the locked and unlocked positions based upon a received signal strength of the remote access command from said remote access device via said at least one antenna.

10. The wireless access control system of claim 9, wherein said at least one antenna comprises first and second directional antennas, wherein said lock assembly further comprises a touch sensor coupled to said lock controller, and wherein said lock controller is configured to, based upon a sensed touch from said touch sensor, switch to the second directional antenna, determine a received signal strength at each of said first and second directional antennas, and switch said lock between the locked and unlocked positions based upon the received signal strength at said first directional antenna being greater than the received signal strength at said second directional antenna.

11. The wireless access control system of claim 10, wherein said lock controller is configured to disable switching of said lock between the locked and unlocked positions based upon the received signal strength at said second directional antenna being greater than the received signal strength at said first directional antenna.

12. The wireless access control system of claim 10, wherein said lock controller is configured to determine a number of touches from said touch sensor within a given time period, and, if said lock is in said unlocked position, switch said lock to the locked position based upon exceeding a threshold number of touches within the given time and without wirelessly receiving, via said wireless communications circuitry, the remote access command from said remote access device.

13. The wireless access control system of claim 10, wherein said lock controller is configured to determine a number of touches from said touch sensor within a given time period, and, if said lock is in said unlocked position, switch said lock to the locked position based upon exceeding a threshold number of touches within the given time and without exceeding a threshold received signal strength at least one of said first and second directional antennas.

14. A lock assembly comprising:

a lock;

lock wireless communications circuitry; and a lock controller coupled to said lock and said lock wireless communications circuitry, and configured to switch the lock between a locked position and an unlocked position, communicate with a remote access device remote from said lock based upon wirelessly receiving, via said lock wireless communications circuitry, a lock communication enable command from a plugin device, the remote access device wirelessly transmitting a remote access command to the plugin device for switching said lock between the locked and unlocked positions, the plugin device determining a first distance between the remote access device and said lock based upon wireless communication therewith, determining when the remote access device is within a second distance from said lock, the second distance being closer to said lock than the first distance, and wirelessly send the lock communication enable command to enable said lock based upon the remote access device being within the second distance from said lock, and switch said lock between the locked and unlocked positions based upon wirelessly receiving, via said wireless communications circuitry, the remote access command, independent from said plugin device, from said remote access device and authentication of said remote access device.

15. The lock assembly of claim 14, further comprising a visual indicator adjacent said lock and wherein said lock controller cooperates with said visual indictor to indicate a status of said lock.

16. The lock assembly of claim 15, wherein said lock controller is configured to selectively change said visual indictor when the remote access device moves across the second distance.

17. The lock assembly of claim 15, wherein the status of said lock comprises at least one of an awake state, a hibernation state, a lock state, an unlock state, and a programming state.

18. The lock assembly of claim 15, wherein the visual indicator comprises a light emitting diode.

19. The lock assembly of claim 14, wherein said lock comprises a lock cylinder for receiving a key therein and a lock strike coupled to said lock cylinder, and wherein said visual indicator is carried around said lock cylinder.

20. The lock assembly of claim 14, wherein said lock controller is configured to switch said lock between the locked and unlocked positions based upon wirelessly receiving, via said wireless communications circuitry, the remote access command directly from the remote access device.

21. The lock assembly of claim 14, wherein said lock assembly comprises at least one antenna coupled to said lock wireless communications circuitry, and wherein said lock controller is configured to enable switching of said lock between the locked and unlocked positions based upon a received signal strength of the remote access command from said remote access device via said at least one antenna.

22. A plugin device for a wireless access control system for a door, the plugin device comprising:

a plugin device housing;

a plugin device power connector carried by said plugin device housing for coupling to a mains power receptacle;

plugin device wireless communications circuitry carried by said plugin device housing; and a plugin device controller carried by said plugin device housing and coupled to said plugin device wireless communications circuitry, said plugin device controller configured to determine a first distance between a remote access device remote from a lock of a lock assembly carried by the door based upon wireless communication therewith, the remote access device wirelessly transmitting a remote access command to the plugin device for switching the lock between the locked and unlocked positions, determine when the remote access device is within a second distance from the lock, the second distance being closer to said lock than the first distance, and wirelessly send a lock communication enable command to enable the lock, based upon the remote access device being within the second distance from said lock, to switch the lock between a locked position and an unlocked position, the lock communicating independently from said plugin device with the remote access device based upon wirelessly receiving the lock communication enable command from said plugin device, and switching the lock between the locked and unlocked positions based upon wirelessly receiving the remote access command from the remote access device and authentication of said remote access device.

23. The plugin device of claim 22, wherein said plugin controller is configured to determine the first distance based upon a receiving signal strength indication (RSSI).

24. A wireless access control system for a door, the wireless access control system comprising:

a lock assembly carried by the door and comprising a lock, lock wireless communications circuitry, and a lock controller coupled to said lock and said lock wireless communications circuitry, and configured to switch the lock between a locked position and an unlocked position;

a plugin device remote from said lock and comprising plugin device wireless communications circuitry, and a plugin device controller coupled to said plugin device wireless communications circuitry; and a remote access device remote from said lock and comprising remote access wireless communications circuitry, and a remote access controller coupled to said remote access wireless communications circuitry and configured to cooperate with said remote access wireless communications circuitry to wirelessly communicate with said plugin device for switching said lock between the locked and unlocked positions;

said plugin device controller configured to determine a first distance between said remote access device and said lock based upon wireless communication therewith, and determine when said remote access device is within a second distance from said lock, the second distance being closer to said lock than the first distance, and wirelessly send a lock communication enable command to enable said lock based upon said remote access device being within the second distance from said lock;

said lock controller configured to communicate, independently from said plugin device, with said remote access device and configured to receive authentication of said remote access device based upon wirelessly receiving, via said wireless communications circuitry, the lock communication enable command from said plugin device.

25. The wireless access control system of claim 24, wherein said lock assembly further comprising a visual indicator adjacent said lock, and wherein said lock controller cooperates with said visual indictor to indicate a status of said lock.

26. The wireless access control system of claim 24, wherein said lock controller is configured to selectively change said visual indictor when said remote access device moves across the second distance.

27. The wireless access control system of claim 24, wherein the status of said lock comprises at least one of an 12In re Patent Application of: DUMAS ET AL. Ser. No. 13/654,132 Filed: Oct. 17, 2012 awake state, a hibernation state, a lock state, an unlock state, and a programming state.

28. The wireless access control system of claim 24, wherein said plugin device further comprises a plugin device housing and a plugin device power connector carried by said housing for coupling to a mains power receptacle.

29. A method of wireless access control for a door, the wireless access control method comprising:

transmitting, from a remote access device remote from a lock to be controlled, a remote access command to a plugin device for switching the lock carried between the locked and unlocked positions, the lock being carried by the door;

determining, using the plugin device, a first distance between the remote access device and the lock based upon wireless communication therewith;

determining, using the plugin device, when the remote access device is within a second distance from said lock, the second distance being closer to said lock than the first distance; wirelessly sending, using the plugin device, a lock communication enable command to enable the lock based upon the remote access device being within the second distance from the lock;

communicating, using the lock, with the remote access device based upon wirelessly receiving the lock communication enable command from the plugin device; and switching the lock between the locked and unlocked positions based upon wirelessly receiving the remote access command, independently from said plugin device, from the remote access device and authentication of said remote access device.

30. The method of claim 29, further comprising selectively activating a visual indicator adjacent the lock assembly to indicate a status of said lock.

31. The method of claim 29, wherein the visual indicator is selectively changed when the remote access device moves across the second distance.

* * * * *

UNITED STATES PATENT AND TRADEMARK OFFICE

CERTIFICATE OF CORRECTION

PATENT NO. : 9,196,104 B2
APPLICATION NO. : 13/654132
DATED : November 24, 2015
INVENTOR(S) : Philip C. Dumas, Thomas Bennett and Steven Fiske It is certified that error appears in the above-identified patent and that said Letters Patent is hereby corrected as shown below:

In the Claims

| | |
|---|---|
| Column 15, Line 27, Claim 13 | Delete: “strength at least” Insert -- strength at at least -- |
| Column 18, Lines 3-4, Claim 27 | Delete: “12In re Patent Application of: DUMAS ET AL. Ser. No. 13/654,132 Filed: Oct. 17, 2012” |

Signed and Sealed this
Twelfth Day of July, 2016

Michelle K. Lee
*Director of the United States Patent and Trademark Office*